E. POPE.
TYPEWRITING MACHINE.
APPLICATION FILED MAR. 9, 1918.
1,347,290.
Patented July 20, 1920.
7 SHEETS—SHEET 6.
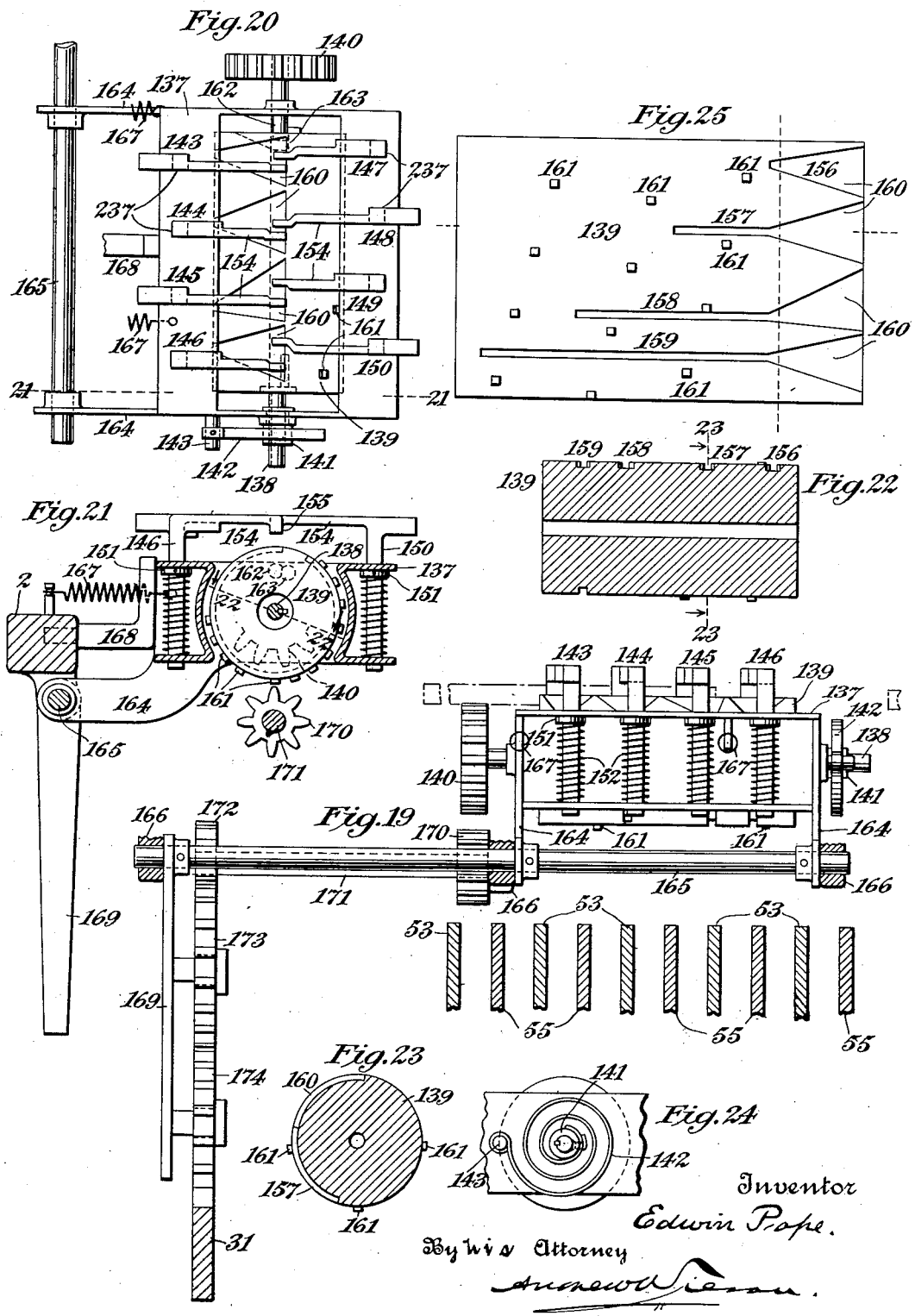

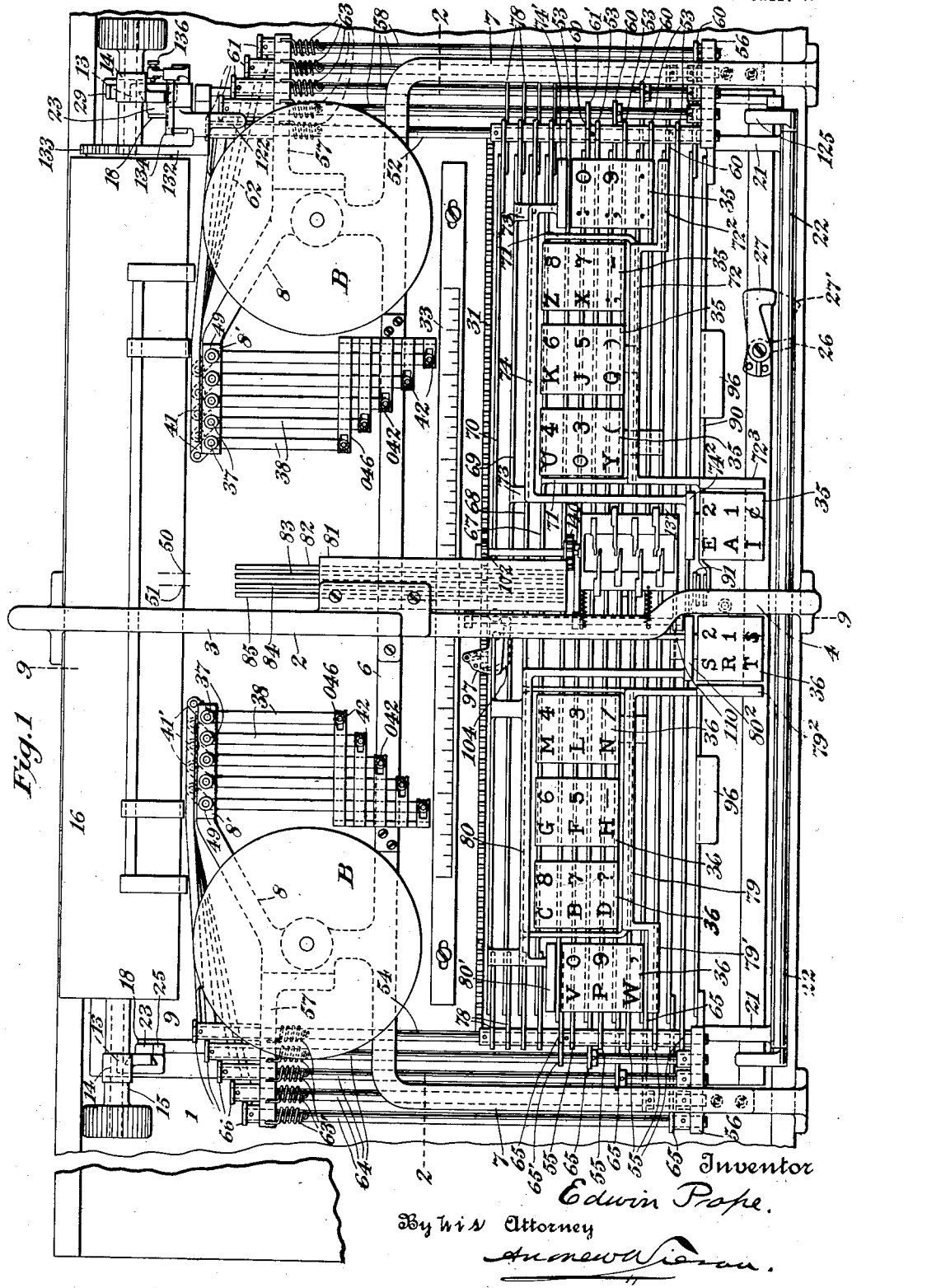

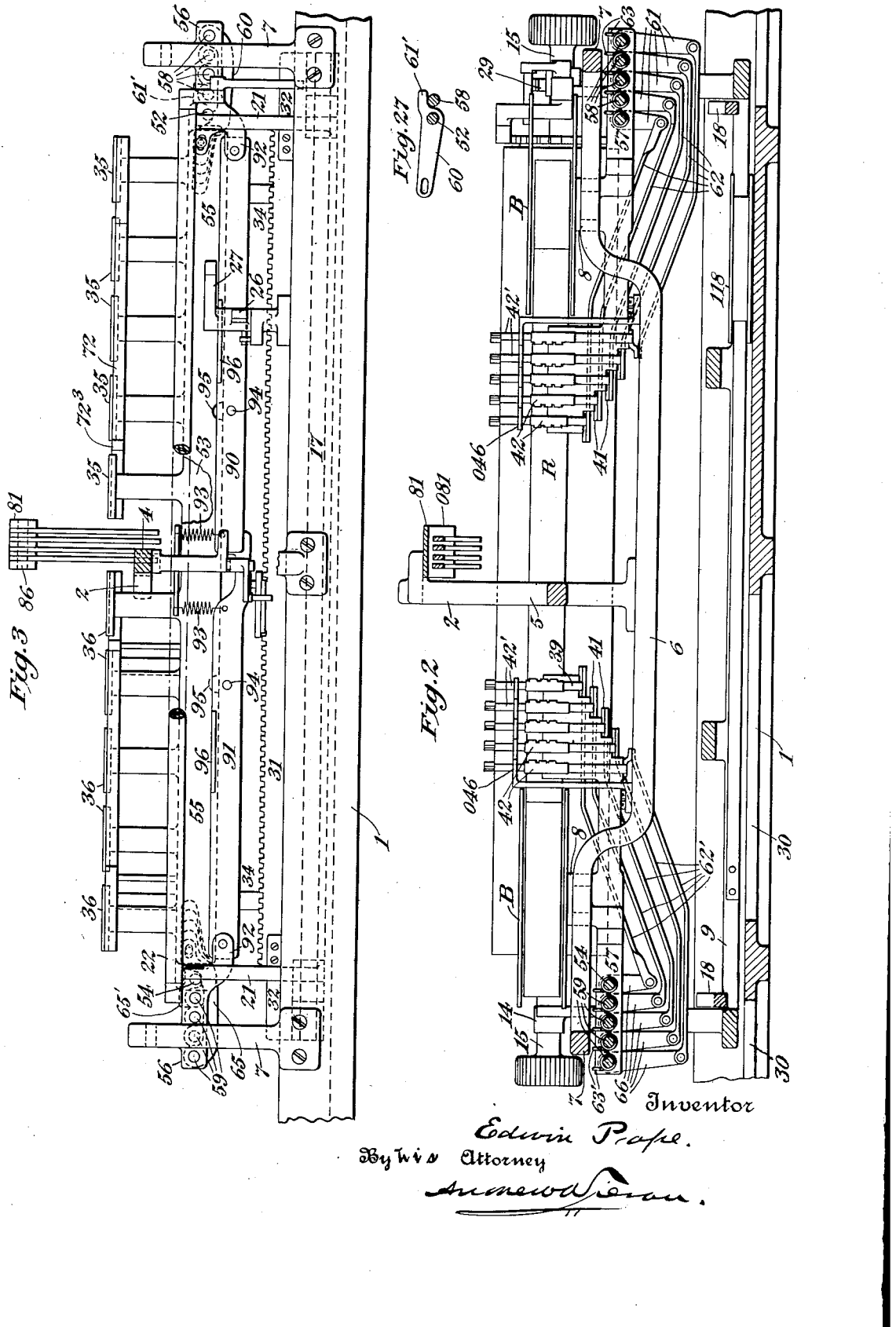

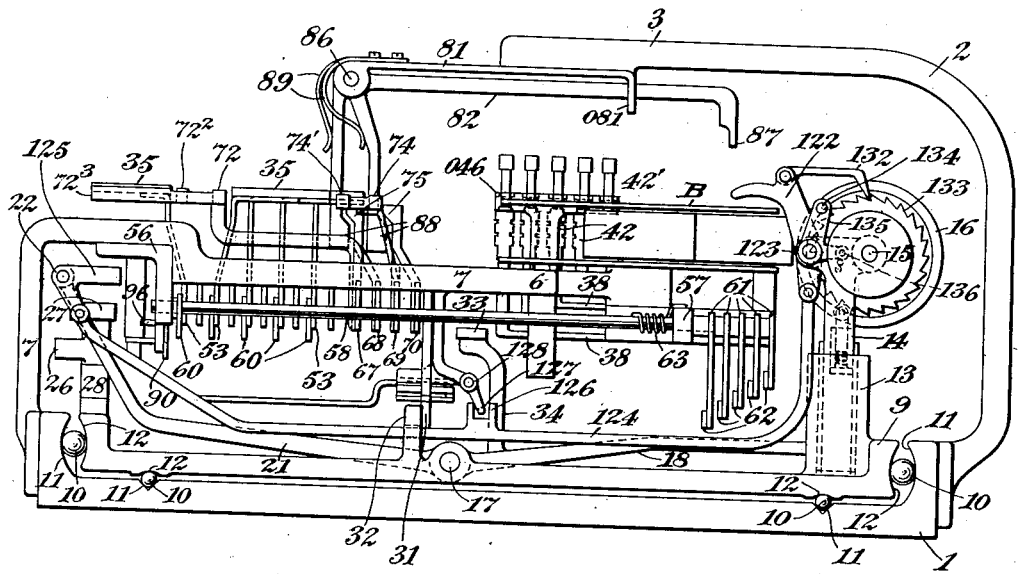
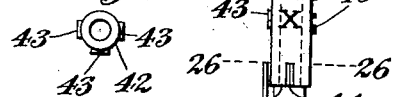
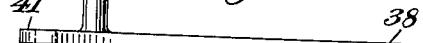

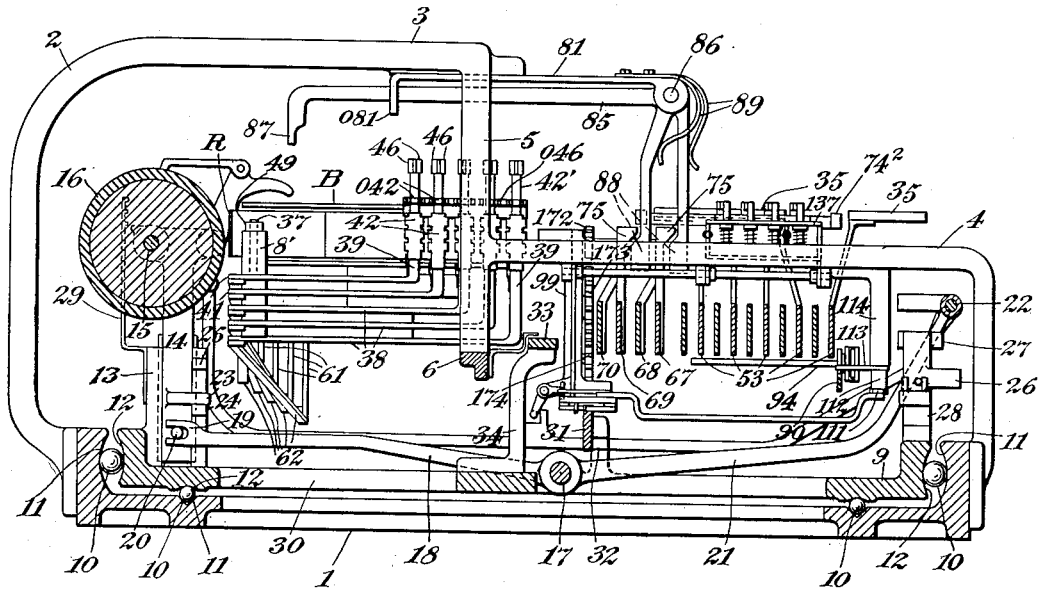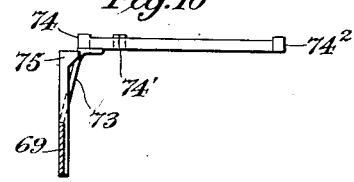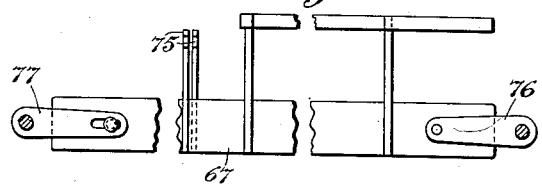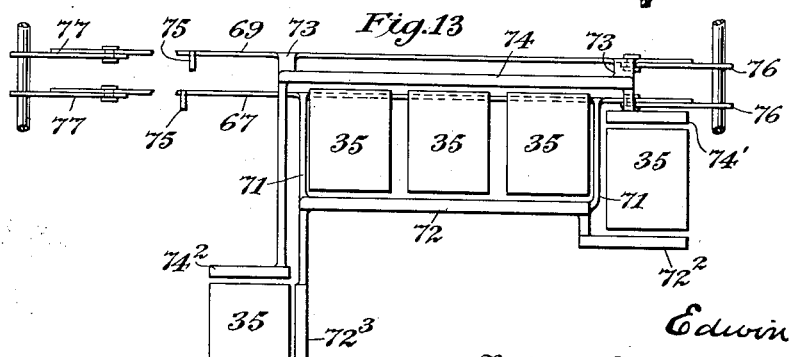

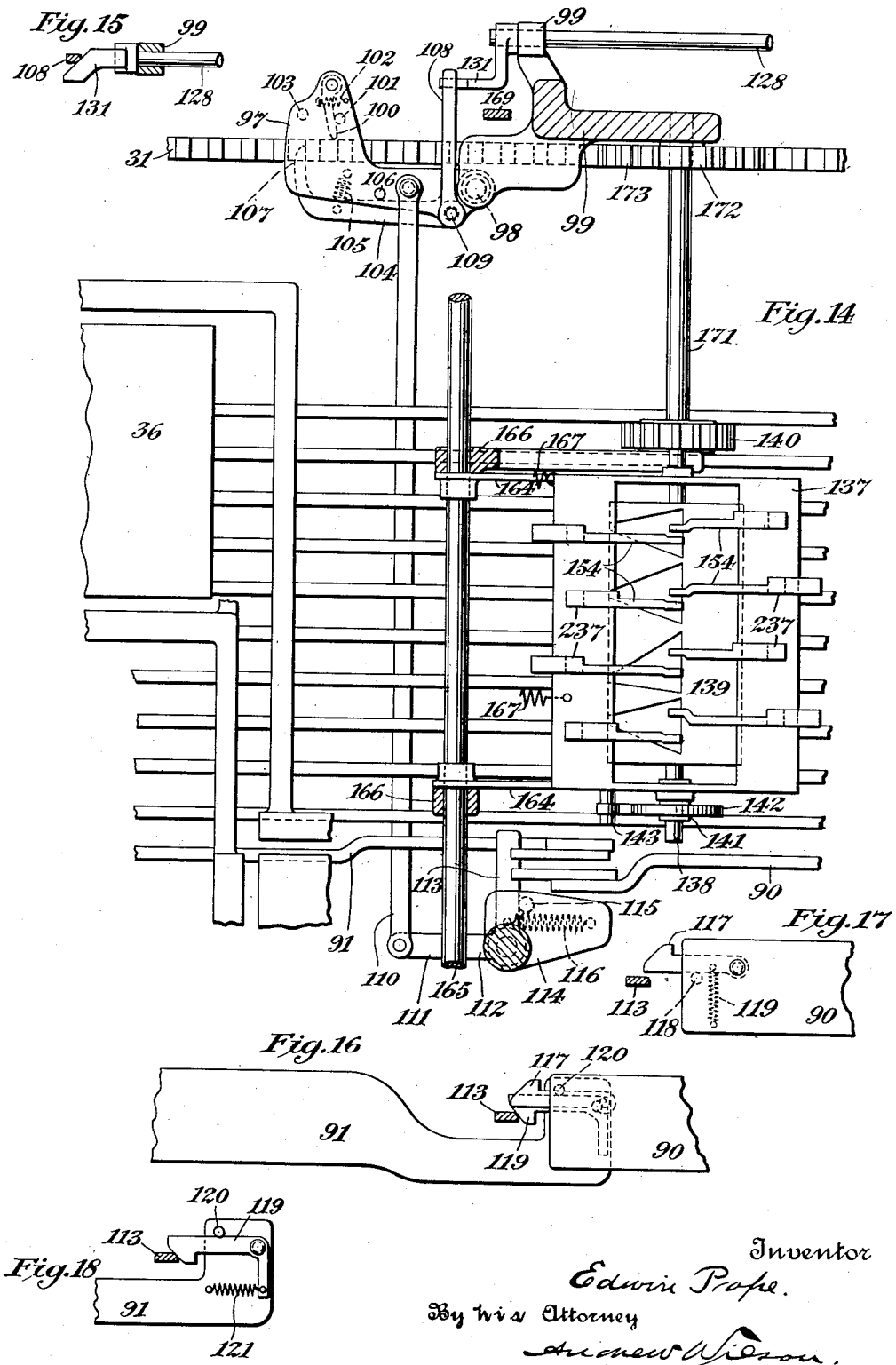

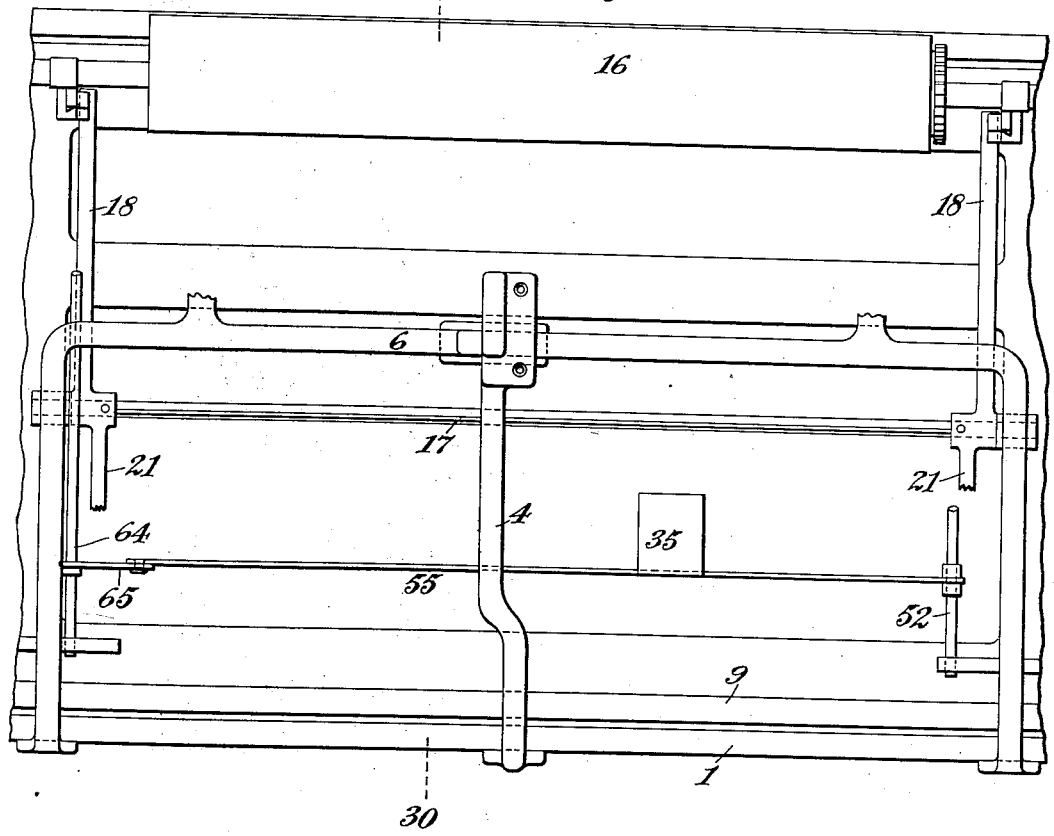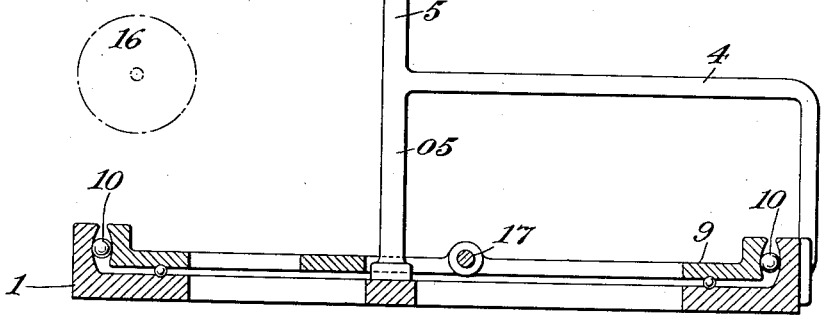

UNITED STATES PATENT OFFICE.

EDWIN POPE, OF QUEBEC, QUEBEC, CANADA.

TYPEWRITING-MACHINE.

1,347,290.  Specification of Letters Patent.  Patented July 20, 1920.

Application filed March 9, 1918. Serial No. 221,352.

*To all whom it may concern:*

Be it known that I, EDWIN POPE, a subject of the King of Great Britain, residing at Quebec, in the Province of Quebec and Dominion of Canada, have invented certain new and useful Improvements in Typewriting-Machines, of which the following is a specification.

This invention relates to typewriting machines; and its main object is to provide a typewriting machine having the capacity for more rapid printing than the machines now in use. And to that end I employ novel means whereby two characters may, if desired, be printed simultaneously, the number of type controlling or key elements being materially reduced, and the spacing mechanism being so improved as to greatly increase the speed with which the platen may be adjusted into the desired printing positions; all of which, together with other details of my invention, is more fully set out in the specification.

For illustrating my invention and some of the means I employ for attaining the above mentioned objects, together with the features of my invention not hereinbefore described, I have embodied them in a machine which is shown in the accompanying drawings, and which is to be considered merely as one form of the invention.

Figure 1 of the drawings is a plan of a typewriting machine embodying my invention, with portions of the base and underlying mechanisms omitted for clearness.

Fig. 2 is a longitudinal section of the machine taken on the line 2—2 of Fig. 1.

Fig. 3 is a front elevation of the machine taken as far as the line of section 2—2, with parts broken away at the middle.

Fig. 4 is an elevation of the machine taken from the right.

Figs. 5 to 8, inclusive, 26 and 28 are details of the type arm construction, Figs. 6 and 28 being views of right and left hand key arms, respectively, and Fig. 26 being taken on the line 26—26 of Fig. 5.

Fig. 9 is a transverse section of the machine on the line 9—9 of Fig. 1, looking from left to right.

Figs. 10 to 13 inclusive are details of the key board construction.

Fig. 14 is a plan on an enlarged scale of the escapement and spacing mechanisms.

Fig. 15 is a detail of the carriage return mechanism.

Figs. 16, 17 and 18 are details of the regular or single spacing mechanism.

Fig. 19 is a side elevation, on an enlarged scale of the special or multiple spacing mechanism, looking from left to right as on Fig. 1.

Fig. 20 is a plan of a portion of the same, also on an enlarged scale.

Fig. 21 is a section on the line 21—21 of Fig. 20, looking up.

Fig. 22 is a section on the line 22—22 of Fig. 21, looking down.

Fig. 23 is a section on the line 23—23 of Fig. 22 as though in elevation looking to the right.

Fig. 24 is a detail end elevation of a portion of the special or multiple spacing mechanism, looking up on Fig. 20.

Fig. 25 is a development of the cylinder of the special or multiple spacing mechanism.

Fig. 27 is a detail of the key-lever mechanism.

Fig. 29 is a partial plan view, with parts omitted, of the base, frame and carriage; and Fig. 30 is a sectional view, on line 30, Fig. 29, looking to the right, of the base, frame and carriage.

Like characters refer to like parts in all the figures of the drawings.

In the embodiment of my invention shown in the drawings, the numeral 1 designates the base of the machine which may be of any suitable construction, and is here illustrated as having a low main portion, with higher portions or flanges at the front and back to form carriage ways, and, preferably, with perforations in the portion between for reducing the weight.

Mounted on the base near its middle portion is a transverse member such as 2, secured to the base by suitable means, such as screws, connecting it to the raised front and back portions of the base. The member 2 as here illustrated is in the form of an irregular bar or rib, having a high portion 3 near the back, and a low portion 4 near the front connected by a vertical portion 5. Various parts are supported directly or indirectly by the member 2 and include the type arms, keyboard mechanism, and ribbon mechanism.

Supported by the lower end of the vertical portion 5 of the member 2 is a frame member 6, consisting of a longitudinal portion connected to end portions 7, 7, which in turn are secured to the front of the base by suitable means such as screws. The member 6 also has two branches 8 extending toward the back of the machine and on which are mounted the bars, and also the bobbins B of the ribbon R.

The carriage of the machine is designated by the numeral 9, and is mounted on the base 1 so as to pass to and fro along the same. Any suitable means may be provided for effecting this, such as anti-friction members or balls 10 movable in ways 11 and 12 on the base and carriage respectively.

The carriage and the parts mounted thereon can pass freely under the transverse member 2, the frame member 6 and the parts mounted on these members.

The carriage is provided with end extensions 13, in which vertically movable brackets 14 are mounted in suitable ways, and journal the spindle 15 of the platen 16 which is of the usual construction and faced with rubber or other suitable material.

Also mounted on the carriage and journaled thereto at the middle portion thereof, is a longitudinal shaft 17 on the ends of which are secured two levers 18 one near each end of the carriage, said levers having forked ends 19 bearing on pins 20 fixed in the brackets 14. Also secured to the shaft 17 are two other levers 21, which support the platen shift rod 22 situated at the front of the machine and adapted to shift the platen to two different heights.

The platen is normally held by gravity in the position shown in Fig. 9, with the stops 23 of the brackets 14 resting on the stops 24 which form part of the extensions 13. The highest position of the platen is obtained by pressing down on the rod 22, rocking the levers 21, shaft 17, levers 18, and through the pins 20 and brackets 14 raising the platen 16 until the stops 23 come in contact with the stops 25. An intermediate position of the platen is obtained by the use of a thumb piece 26 and a stop member 27 mounted on a bracket 28 on the carriage frame. By moving the stop member 27 outwardly by means of the thumb piece 26, as indicated in dotted lines at 27' in Fig. 1, the member 27 is brought into the downward path of the rod 22, and the platen 16 is thus prevented from rising above its middle portion. An indicator such as 29 may also be provided to show the position the platen is in at any time.

The carriage frame is made of suitable form and provided with raised front and rear portions which give strength and stiffness, and the web portion may be skeletonized by perforations such as 30.

A rack 31 is mounted on the carriage being secured to extensions 32 by suitable means such as screws, and there is also a scale 33 on the carriage, secured to brackets 34 which are suitably fastened to the carriage web, There are ten character keys provided for the machine, which keys are divided into two groups, each group consisting of five keys. The five keys on the right hand are designated by the numeral 35 and arranged conveniently for the four fingers and thumb of the right hand, while the five on the left, designated by the numeral 36, are conveniently arranged for the four fingers and thumb of the left hand. Each key is provided with six characters which correspond to similar charcaters on the bars; and the keys bring the bars into operation by means of connecting mechanism.

There are ten bars, as shown in Figs. 1, 2 and 9, and in detail in Figs. 5 to 8 inclusive. Each bar consists of a shaft 37, a horizontal extension 38, a vertical portion 39 which is elongated to form a bearing spindle 40. And next to the shaft 37 there is a lug or arm 41 by means of which the bar is swung to and fro.

Mounted on the bearing spindle 40 is a cylinder 42, provided with six characters 43, and also with three notches 44, in one of which the end of the spring 45, attached to the vertical portion 39, is adapted to bear and center the characters in any one of three circumferential positions on the bearing spindle. Each cylinder 42 has an extension 42'; and connected to the latter are three wing portions 46, which are adapted to engage with mechanism hereinafter to be described. Each cylinder is held in position on its bearing spindle, between the shoulder 47 and the head 48. The bars are mounted to swing on their shafts 37 in the bearings 8' in the branches 8 of the member 6, and are held vertically by collars 49. The bars on the right have a centering or printing point 50, and those on the left a centering or printing point 51, the space between the printing points being such that any cylinder of the right hand set can print at the same time with any one of the left hand set. The five bars of a set are of different lengths, so arranged as to swing clear of each other when one or another of them is operated.

Each character key 35 or 36 is provided with a lever on an extension of which it is mounted as indicated in Figs. 3 and 4. And there are accordingly ten levers, which are arranged in two sets of five each, the five on the right being hung at one end on a rod 52 and being designated by the numeral 53, and the five on the left being hung at one end on a rod 54 and being designated by the numeral 55. The other ends of said levers are supported in a manner hereinafter to be described.

The rods 52 and 54 are mounted in brackets 56 and 57 secured respectively to the portions 7 and 8 of the frame member 6. Four other rods, designated by 58, are also mounted in the right hand brackets 56 and 57, while four more rods, designated by 59, are mounted in the left hand brackets 56 and 57. Each of the five rods 52 and 58 on the right is provided with a horizontal arm 60 secured thereto; and each arm is provided with a slot at its free end in which slot is placed a suitable stud secured to one of the five character key levers 53, so that when a right hand character key is pressed down, its lever 53 moves the arm 60 connected with it and said arm revolves its respective rod 52 or 58.

Each of the rods 52 or 58 is also provided with a vertically disposed arm 61 at its rear end; and each of said vertical arms 61 is connected by a link 62 to the lug or arm 41 of one of the five right hand bars.

It will be noted that the horizontal arms 60 are of varying length and that all but the left one, as shown in Figs. 1, 2 and 3, pass underneath the rods 52 and 58, so that they clear the same when they move downwardly in conjunction with their respective character key levers. The vertical arms 61 are also of different lengths, to bring about the proper clearance between the bent links 62, which are of the form shown, and also for the purpose of clearance. Coiled springs 63 hold the rods 52 and 58 in their normal positions, in which the arms 60 press upward against the under sides of one or more of said rods 52, 58; except in the case of the arm on rod 52, which arm is provided with a tail 61' extending to the right and on top of the adjoining rod 58.

A similar arrangement of keys and type bar connecting mechanism is provided for the left side of the machine, wherein the rods 54 and 59 are each provided with a horizontal arm 65, which arms are connected to the remaining five left hand key levers; and the other end of the said rods 54 and 59 are provided with arms 66 connected in turn to links 62', the ends of each link being pivoted to the lugs 41' of one of the five bars of the left hand group. Coiled springs 63' hold the rods and connected mechanism in the normal positions.

Between the ten key levers and the carriage rack are four more similar bars of approximately the same dimensions. These are designated by 67, 68, 69 and 70 and arranged in two sets, 67 and 69 being operated from mechanism associated with the right hand keys, and 68 and 70 by mechanism associated with the left hand keys.

Figs. 10 to 13 represent the bars 67 and 69 and associated mechanisms; and in these figures it will be noted that the bar 67 has two extensions 71, a longitudinal bar 72 next to three of the keys, a longitudinal extension $72^2$ of 72 next to the extreme right hand key and another extension $72^3$ at right angles and extending next to the right hand thumb key 35. The bar 69 has extensions 73, 78 connecting it to a longitudinal bar 74 placed next to the three middle keys and having an extension 74' next to the extreme right hand key 35 and another extension $74^2$ next to the left hand or thumb key 35 of the right hand group.

Cam members 75 are fastened to the bars 67, 68 and 69 and 70, and the latter bars are movably mounted on arms 76 and 77 journaled on the rods 52 and 54 which arms are held in their normal positions by springs 78.

The bars 68 and 70 are provided with extensions 79, 79', $79^2$ and 80, 80', $80^2$, similar to 72, 72', $72^3$ and 74, 74', $74^2$ of the bars 67 and 69, so that the bars 68 and 70 can be operated in conjunction with the left hand keys 36 in the same manner as 67 and 69 may be operated with the right hand keys 35, which last operation will be more fully explained hereinafter.

Mounted on the transverse frame member 2 is bracket 81; and at the front end of said bracket are pivoted four bell cranks 82, 83, 84 and 85 by means of a pivot pin 86, the horizontal branches of said bell cranks being each provided with a downwardly extending pin 87, and being alined in slots in a downward extension 081 of the bracket 81; while the vertical branches of the bell cranks are provided with cam portions 88, and are pressed to duty by springs 89.

The cams 88 coact with the cams 75 of the bars 67, 68, 69, and 70, the depressing of any one of which causes its co-related bell crank of the series 82 to 85 to be rocked so that its pin 87 comes in the path of the wing portions 46 on a type bar.

From the foregoing it will be apparent that if one of the five right hand character keys is depressed, together with one of the bars 72 or 74 or other extensions, by means of a finger or thumb pressing on each, that a bar will be set in motion, and a pin 87 of the right hand bell crank will be set in the path of the wings 46 of the type cylinder on the moving bar, and that the further movement of the bar past the pin 87 will cause the type cylinder to be turned; thus bringing the proper type into position to print, in which position it will be held by the detent 26. And when the printing has taken place as the bar is retracted the key 042 will encounter the fixed stop 046 causing the type cylinder to be returned to its original position, the bell crank and its pin 87, the bar 72 or 74, and the key lever and key, returning to their normal positions. A similar operation takes place with the five left hand keys and the mechanisms connected therewith, the bars 79 and 80, the two left hand bell cranks and the five left hand bars.

If a right hand character key and a left hand character key are operated at the same time, two characters will be printed at once, side by side, and suitable feeding or spacing mechanism is provided to cause the carriage and cylinder to advance two spaces. If a left hand key only is depressed the carriage is first fed one space, and a character is then printed. If a right hand key only is pressed a character is first printed and then the carriage is fed one space. The feeding of spacing mechanism is illustrated in Figs. 3, and 14 to 18 inclusive.

There are two space levers, one designated by 90, for the five right hand keys, and one designated by 91, for the left hand keys, and said levers are pivoted on lugs 92 of the brackets 56 and held in their normal positions by springs such as 93. Each of the levers 90, 91 has a rod 94 extending under the key levers, and each of said rods 94 causes its lever to be pressed down by the movement of either of the five levers whose keys are above the rod. The other levers are recessed, as at 95, or otherwise arranged so that they do not engage rods 94.

Key portions 96 are provided on the levers 90 and 91, by means of which they may be pressed down, preferably by thumb action.

Escapement mechanism is provided to coöperate with the levers 90 and 91, and this mechanism embodies an oscillatory member 97 pivoted at 98 to the bracket 99 secured to the low portion 4 of the transverse frame member 2. And the member 97 is provided with a spacing dog 100, normally held against a stop 101 by a spring 102, and is also provided with a second stop 103 which limits the movement of the dog toward the left. The member 97 is also provided with a holding dog 104 which is normally held by a spring 105 against a stop 106. And the dog 104 is provided with a tooth 107 and a tripping arm 108 connected to the toothed portion by the stud 109 by which it is pivoted to the part 4 of the frame 2; so that by oscillating the tripping arm to the left the tooth 107 can be withdrawn from the rack 31 with the teeth of which it is normally engaged. A link 110 connects the member 97 pivotally to one arm 111 of a bell crank 112, the other arm 113 of which is in a higher plane than the arm 111. The bell crank 112 is pivoted on a bracket 114 on the frame member 2, and it is normally held against a stop 115 by a spring 116.

At the free end of the space lever 90 is a latch 117 normally held against a stop 118 by a spring 119; and the relations of the lever 90 and latch 117 are such that on its downward movement, the latch slips up over the arm 113 of the bell crank 112; but on the return movement of the lever 90, the latch pushes the arm 113 to the left, which latter movement is transferred through the other arm of the bell crank 112 and the link 110 to the member 97, causing the tooth 107 to move out of the rack and the spacing dog 100 to engage therewith. When the tooth 107 is released the carriage moves to the left under the influence of a conventional spring carried in the drum 118 on the frame 1, (see Fig. 2.) The spacing dog is arrested by the stop 103, and the member 97 then returns to its initial position, under the influence of the spring 116, carrying with it the bell crank 112, when the latch 117 has passed the arm 113 of the bell crank. The spacing done by means of the lever 90 takes place, therefore, after the printing of the character, as is occurs when the parts are on their return movement.

On the free end of the left hand space lever 91 is the latch 119, normally held against a stop 120 by a spring 121. On the depression of the space lever 91, the latch 119 immediately moves the arm 113 of the bell crank 112 to the left; and, through the above noted connections to the escapement member 97, moves the same so as to cause the withdrawal of the tooth 107 and the consequent operation of the spacing dog 100 and the movement of the carriage one space by its actuating spring. The return movement of the space lever 91 causes the reëngagement of the tooth 107 and the return of the various parts to their initial positions. It will be obvious that these last described movements effect the spacing or feeding before the printing of a character.

When the carriage has been fed to the left, as far as is desired, and a return to the starting position is wished, this can be effected by the movement of the line space lever 122, to feed one space, upon which the tooth 107 is released and the carriage can be moved to the right by pushing to the right on said lever 122. The said line space lever is pivoted at 123, (see Fig. 4), and is connected by its lower branch to a bent rod 124, which in turn is connected to the thumb piece 125 pivoted on the rod 22. The rod 124 has a raised portion having a notch 126 in which engages an oscillatory rod 127 mounted on a spindle 128 journaled in brackets connected to the frame of which brackets one, 99, is shown. At the left hand end of the spindle 128 is a cam member 131 which is adapted to move the tripping arm 108 when the spindle 128 is revolved. This mechanism effects the release of the carriage from the escapement when the space lever is moved.

The space lever 122 is provided with a pawl 132 which operates a ratchet wheel 133 secured on the right hand end of the paper cylinder. A movable stop 134 limits the movement of the space lever and is mounted on a bell crank 135 having a movable pin 136, by means of which it can be shifted to different positions.

Any suitable arrangement and selection of characters for the machine may be made, and that indicated in Fig. 1 is merely illustrative of one such arrangement. Thus in the selection shown in Fig. 1, it will be noted that the capital letters of the alphabet are arranged on the left hand side of each key except in the case of the extreme right hand key. The lower case letters are normally printed, using the capitals as indicators. If capitals are required, the stop members 26 and 27 and the shift bar 22 are employed. If the numeral or characters at the left of the keys are required, it is only necessary to press down on the rod 22, and then the keys are operated as hereinbefore described.

The spacing mechanism for spacing five or more units is located at the central front portion of the machine, as illustrated in Figs. 1 and 9, and shown separately on an enlarged scale in Figs. 19 to 25, inclusive. This mechanism has a frame 137, preferably formed of sheet metal, and having bearings for a spindle 138, on which is secured a cylinder 139. At the rear end of the spindle is secured a pinion gear 140 and at the front end is a sleeve 141, to which is secured the inner end of a coiled spring 142, which has its outer end held by a stud 143. The spindle 138 is grooved, and a key in the sleeve 141 causes the two to turn together.

The frame 137 is provided with a plurality of holes 237 preferably square, on each side of the cylinder and in which are mounted a series of plungers 143, 144, 145 and 146 on one side, and 147, 148, 149 and 150 on the other side, which plungers have shanks to conform to the contour of the holes and to prevent turning of the plungers. The plungers are provided with collars 151, and they are normally held up by springs 152 around their shanks, compressed between the frame and said collar 151. The plungers have arms 154, having projections 155 extending downward and all placed on a line directly over the center line of the spindle and cylinder.

The cylinder is provided with a series of grooves, in this case four numbered respectively 156, 157, 158 and 159, extending around its periphery and having wedge-shaped portions 160. The first of the grooves 156, is, in this instance, wedge-shaped throughout its length.

The cylinder is also provided with a plurality of pins 161 which are best shown in the developed view at Fig. 25, where it will be seen that the pins are all out of alinement with each other both circumferentially and longitudinally of the cylinder. Their heights are approximately the same as the depths of the grooves.

There is a clearance space shown between the frame and the cylinder at each end of the latter; and in the rear space is placed a stop pin 162 which normally engages a stop face 163 on the end of the cylinder. The spring 142 normally holds the stop face 163 against the pin 162; and it will be clear that the cylinder is free to move endwise a short distance in either direction with the stops in contact, and the cylinder 139 and gear 140 being both fixed to the spindle 138, the gear will be shifted with the cylinder.

The left hand side of the frame is provided with extensions 164 having holes through which a rod 165 passes and is thereby secured to said extensions; and the device is pivoted to the frame member 2 by said rod 165 which passes through ears 166, on said frame member. Springs 167 hold the device in its normal position against a stop 168. The rod 165 has a tripping arm 169 fastened thereto and so located that it can engage the tripping arm 108 of the escapement when the frame of the spacing device is pushed down so as to rotate the rod 165 and move the arm 169 to the left.

There is a pinion gear 170 under the gear 140, connected by a spindle 171 to a gear 172, both of the gears 170 and 171 being fast to said spindle. The gear 172 meshes with a gear 173, that meshes with gear 174, which in turn meshes with the rack 31; so that the turning of the gear 170 can govern the movement of the carriage. The gears 173 and 174 are rotatably mounted on the bracket 99 carrying the escapement member 97, which bracket is secured to frame member 2. The spindle 171 and gears 170 and 172 are rotatably held by extensions of the frame member 2.

When it is desired to feed the carriage, for instance ten spaces, the key of the plunger 148 is pressed down, but as its spring overcomes the resistance of the spring 167, the frame 137 is first moved down so that the pinion gear 140 engages the gear 170, thus connecting the cylinder 139 to the carriage rack. Further depression of the plunger 148, brings its projection 155 into the groove 157, centering it first by the wedge-shaped portion 160. The member 169 has now released the escapement and the cylinder turns clockwise through the influence of the gearing until the projection 155 of the plunger 148 meets the end of the groove and stops further movement. In a similar way the carriage can be spaced five, fifteen or twenty teeth or spaces by means of the plungers 147, 149 and 150 respectively.

If it is desired to space the carriage six teeth, it is necessary to press two plungers, 148 and 143, whereupon the cylinder is alined so that the projection 155 of plunger 148 enters the groove 157, but before the end of the said groove reaches the projection 155 of 148, the first pin 161 is held against the projection 155 of plunger 143. If seven teeth are required to be spaced, plungers 148 and 144 are pressed; if eight are required, plungers 148 and 145, are pressed; if nine are required, then 146 and 148 are used. By using 149 or 150, with the proper left hand plunger, 11, 16, and other spacings up to 19 are obtained. The release of pressure on the plungers allows the various parts that have been operated to return to their normal positions.

By means of my improvements I am enabled to very materially increase the speed at which a typewriting machine may be operated; for the keyboard arrangement, whereby a definite key is provided for each finger and thumb, allows the operator's digits to rest continuously upon the keys, and to be extended over the adjacent controlling mechanism whereby the operation of each key may be modified, by simply sliding the particular digit forward or backward or to the side, so as to overlap the modifying key, avoiding the arm movement which is inseparable from the operation of the ordinary typewriter keyboard.

Furthermore, by using the three platen positions in connection with the nine adjustable characters upon each type bar, I am enabled to print nine different characters with the same key, under the control of the same digit; and by using two centering points, one for the group of type bars controlled by each hand, I can, whenever one of the consecutive desired characters can be found the first in the group of type controlled by the left hand and the second in the group controlled by the right hand, print in the same time double the number of characters which can be printed where but one centering or printing point is used. And rapidity of operation is also facilitated by my improved method of feeding the paper carriage a plurality of printing spaces in one continuous movement instead of step by step as is usual.

In other words I save the arm action of the operator and permit each finger and thumb, with slight shifting of position, to perform a plurality of functions in connection with the same key, and to thereby print a considerable plurality of characters with its key, and I print under these conditions, two characters simultaneously, and I increase the speed and facility with which the paper carriage is shifted from one position to another.

Obviously various modifications may be made without departing from the spirit of my invention. Thus, as shown in Figs. 29 and 30, the frame member 2 may be upheld by a support 05 attached to the central portion of the base 1, the carriage 9 being skeletonized to provide a path through it for the support 05 during the travel of the carriage. This obviates obstruction of access to the paper roller by the member 2. And, to give a longer leverage the keys, as 35, may be mounted near the pivoted ends of their key bars as 55 to give increased leverage, and caused to operate type on the opposite side of the machine from the keys.

These things, however, are matters of minor importance.

Having thus described my invention what I claim and desire to secure by Letters Patent of the United States is:—

1. The combination, in a typewriter embodying a platen adjustable laterally into a plurality of recording positions, and a keyboard, of a plurality of type keys, mechanism actuated by each type key and provided with a type member having a plurality of type characters thereupon, and a plurality of control elements and type positioning mechanism operated thereby associated with each type member and severally adapted to rotate the type member in opposite directions into operable positions relative to the platen, each control element being located adjacent to a plurality of type keys and being optionally operable coincidentally with each type key and by the same digit to vary the character printed by the operation of each type key.

2. The combination, in a typewriter embodying a plurality of printing members and connecting mechanism, of two series each having five type actuating elements, each type actuating element being positioned and adapted to be moved by a different and definite digit of the operator, and a plurality of sets of common modifying elements associated with each series of type actuating elements and each set being adapted to be actuated, optionally, simultaneously with an associated type actuating element by the same digit.

3. The combination, in a typewriter embodying a plurality of printing members and connecting mechanism, of two series each having five type actuating elements, each type actuating element being positioned and adapted to be moved by a different and definite digit of the operator, one series by the right hand and the other by the left hand of the operator, and a plurality of sets of common modifying elements associated with each series of type actuating elements and each set being adapted to be actuated, optionally, simultaneously with the associated key actuating element by the same digit.

4. The combination, in a typewriter embodying type carrying means and actuating mechanism therefor, of a plurality of type bars each provided with a relatively movable head having a plurality of printing characters thereupon, character selecting means, and means independent of said actuating mechanism, but operable simultaneously therewith and by the same digit for causing the selecting means to intercept the path of movement of the adjustable printing characters and to thereby adjust the several characters into either of a plurality of desired printing positions relative to and during the printing movement of the type bar.

5. The combination, in a typewriter embodying type carrying means and actuating mechanism therefor, of a plurality of type bars each provided with a relatively adjustable rotatable member having a plurality of printing characters carried thereupon, character selecting means, and means independent of said actuating mechanism but operable simultaneously therewith and by the same digit for causing the selecting means to intercept the path of movement of the rotatable member and thereby to adjust the several characters into either of a plurality of desired printing positions relative to and during the printing movement of the type bar.

6. The combination, in a typewriter embodying a platen, type bars provided with a plurality of rotatable printing characters, and type bar actuating means embodying keys, of shiftable means for moving the platen into a plurality of printing positions, and selecting means, embodying bars and keys independent of the type bar actuating means, for controlling the rotation of said printing characters, such selecting means being manually operable simultaneously with the type bar actuating means and by the same respective digits.

7. The combination, in a typewriter embodying a platen, letter space platen feeding means, means embodying releasable detents and keys for initiating and controlling the operation of the feeding means, step by step, and other means embodying a movable distance gage, a plurality of elements each adapted to arrest the distance gage at a different point, and a second plurality of keys each of which is adapted to control the operation of one of said gage controlling elements and thereby limit the travel of the said feeding means for a selected distance and also to coöperate with others of said plurality of keys and distance controlling elements to initiate and to control through said movable gage the operation of said feeding means for other distances.

8. The combination, in a typewriter, of a platen and two series of character members each series centering at a different printing point on the platen, and all members of each series being singly adapted to assume normal printing relation with the platen both concurrently with a member of the other series and separately, and platen feeding means actuated by the operation of the character members to feed the platen two spaces when two members, one from each series, are operated concurrently, and to feed it one space when any member of either series is operated independently.

9. The combination, in a typewriter, of a platen and character members severally adapted to assume printing relations to the platen at two different printing points, and feeding mechanism adapted to feed the platen before the printing action of one of the character members and to feed it after the printing action of another of the character members.

10. The combination, in a typewriter, of a platen and character members severally adapted to assume printing relations to the platen at two different printing points, actuating means for the character members, and platen feeding mechanism operable by one of the character actuating means to feed the platen before the printing action of one of the character members and operable by another of the character actuating means to feed the platen after the printing action of the latter character member.

11. The combination, in a typewriter embodying traveling record-carrying means and means for optionally moving the same transversely of its line of travel into a plurality of recording positions, of record producing means provided with a plurality of rotatable members each having a plurality of printing characters thereupon arranged in a plurality of series transversely of the line of travel of the carrying means and also in a plurality of series in the plane of travel of the carrying means, and mechanical means associated with each type member and controllable simultaneously therewith and by the same digit for selectively rotating the characters of the latter series into recording position.

12. The combination, in a typewriter embodying a paper platen movable longitudinally and transversely, a plurality of groups of type bars, each group having a different printing center common only to the type bars of that group, each member of each group being operable simultaneously with a member of the other group, and each type bar being provided with a rotatable type member having a plurality of type characters thereupon, of selecting keys, and type keys, each type key being associated with a selecting key, and each selecting key being adapted to govern the rotation of a type member and to be actuated simultaneously with the type key controlling the movement of said type member and by the same digit of the operator, and coöperating means for shifting the platen.

13. The combination, in a typewriter embodying a paper platen movable longitudinally and transversely, a plurality of groups of type bars, each group having a different printing center common only to the type bars of that group, each member of each group being operable simultaneously with a member of the other group, and each type bar being provided with a rotatable type member having a plurality of type characters thereupon, of selecting keys, and type keys, each type key being associated with a selecting key which is adapted to govern the rotation of a type member and to be actuated simultaneously with the type key controlling the movement of said type member and by the same digit of the operator, and coöperating feeding means adapted to feed the paper roller before the printing action of the type bar of one group and after the printing action of the type bar of another group.

14. The combination, in a typewriter embodying a paper platen movable longitudinally and also movable transversely into more than two recording positions, a plurality of groups of type bars, the type bar of each group having the same printing center, but the printing center of the several groups being different, each member of each group being operable simultaneously with a member of the other group, and each type bar being provided with a rotatable type member having a plurality of type characters arranged transversely in more than two series and also arranged longitudinally in more than two series thereupon, each transverse series being adapted to coöperate with the paper platen in a different one of its transverse recording positions, the groups of types severally containing different selections of characters and certain characters being common to both groups, of type keys each having an associated selecting key adapted to govern the adjustment of the type member and to be actuated simultaneously with the type key and by the same digit of the operator, coöperating platen shifting means adapted to shift the paper platen laterally step by step, and means adapted, optionally, to shift it laterally for longer selected distances.

15. The combination, in a typewriter embodying a paper platen movable longitudinally and also movable transversely into more than two recording positions, a plurality of groups of type bars, each group having a common printing center, each member of each group being operable independently of and also simultaneously with a member of the other group, and each type bar being provided with an adjustable type member having a plurality of more than two series of type characters thereupon, each series adapted to coöperate with the paper platen in a different one of its transverse recording positions, of type keys each having an associated selecting key adapted to govern the adjustment of the type member and to be actuated simultaneously with the type key and by the same digit of the operator, and coöperating platen feeding means.

EDWIN POPE.